United States Patent
Smith et al.

(10) Patent No.: US 6,502,402 B1
(45) Date of Patent: Jan. 7, 2003

(54) FUEL MOISTURIZATION CONTROL

(75) Inventors: Raub Warfield Smith, Ballston Lake, NY (US); Jatila Ranasinghe, Niskayuna, NY (US); Barrett David Gardiner, Malta, NY (US)

(73) Assignee: General Electric Company, Schenectady, NY (US)

( * ) Notice: Subject to any disclaimer, the term of this patent is extended or adjusted under 35 U.S.C. 154(b) by 25 days.

(21) Appl. No.: 09/711,157

(22) Filed: Nov. 9, 2000

(51) Int. Cl.[7] .............................................. F02C 3/30
(52) U.S. Cl. ..................... 60/775; 60/39.3; 60/39.53; 60/737
(58) Field of Search .................... 60/39.05, 39.12, 60/39.53, 736, 737, 39.26, 39.3, 775

(56) References Cited

U.S. PATENT DOCUMENTS

| | | | |
|---|---|---|---|
| 4,075,831 A | | 2/1978 | McGann |
| 4,158,680 A | * | 6/1979 | McGann ..................... 165/60 |
| 4,359,284 A | * | 11/1982 | Kude et al. .................. 374/37 |
| 4,733,528 A | * | 3/1988 | Pinto ........................ 60/39.12 |
| 4,999,995 A | * | 3/1991 | Nurse ....................... 60/39.12 |
| 5,241,816 A | * | 9/1993 | Drnevich ................... 60/39.53 |
| 5,319,924 A | * | 6/1994 | Wallace et al. ............ 60/39.02 |
| 5,345,756 A | * | 9/1994 | Jahnke et al. ............. 60/39.12 |
| 5,486,107 A | * | 1/1996 | Bonne ........................... 431/2 |
| 5,565,017 A | * | 10/1996 | Kang et al. ..................... 95/14 |
| 5,807,749 A | * | 9/1998 | Hornemann ................. 374/36 |
| 5,984,664 A | * | 11/1999 | Sutton ......................... 431/12 |
| 6,082,092 A | * | 7/2000 | Vandervort .................. 60/736 |
| 6,247,302 B1 | * | 6/2001 | Tsukamoto et al. ...... 60/39.511 |

FOREIGN PATENT DOCUMENTS

| | | |
|---|---|---|
| EP | 0 086 504 | 8/1983 |
| EP | 0 560 501 | 9/1993 |

\* cited by examiner

*Primary Examiner*—Ted Kim
(74) *Attorney, Agent, or Firm*—Nixon & Vanderhye

(57) ABSTRACT

A combined cycle system includes gas and steam turbines, a saturator and a fuel gas superheater for supplying moisturized heated fuel gas to the gas turbine, a gas turbine exhaust heat recovery system for generating steam and heating water for the superheater and a saturator heater for a recycle water conduit. A constant ratio of water supplied to the fuel gas saturator to dry fuel gas supplied to the fuel gas saturator and Wobbe number is maintained by adjusting the flow of the recycle water stream. Additional properties of the moisturized fuel gas, such as temperature, moisture content, composition, and heating value, are also used to control the water recycle stream to supply consistent moisturized fuel gas to the gas turbine system.

15 Claims, 5 Drawing Sheets

FUEL MOISTURIZATION CONTROL

BACKGROUND OF THE INVENTION

The present invention relates to fuel gas saturators for providing a stable and consistent supply of moisturized fuel gas to a gas turbine during all steady state and transient operating conditions and, in particular, to an instrumentation and control system for adjusting the flow rate of recycle water to the fuel gas saturator to hold constant the ratio of saturator inlet water flow to saturator inlet dry gas flow. In this manner, consistent moisturized fuel properties, particularly the Wobbe number, are maintained within a very narrow range to satisfy gas turbine combustion system requirements.

Generally, a combined cycle fuel gas power plant includes a gas turbine, a steam turbine, a heat recovery steam generator, a fuel superheater and a fuel gas saturator. Dry fuel gas enters the system in the fuel gas saturator, where the fuel gas is saturated with water before entering the fuel gas superheater. After being superheated, the moist fuel gas enters the gas turbine system for combustion. The effluents from the combustion reaction expand in the gas turbine driving a rotor coupled to a generator for generating electricity. The exhaust from the gas turbine enters a heat recovery steam generator, which utilizes the heat from the gas turbine exhaust to generate steam for use in the steam turbine, heat water for use in the fuel gas saturator and to superheat the fuel gas in the fuel gas superheater. The steam generated in the heat recovery system expands in the steam turbine, generating power.

Natural gas fired combined cycles with Dry Low $NO_x$ (DLN) combustion systems impose strict requirements on the fuel gas saturation process due to tight fuel specification tolerances, e.g., variables such as heating value, temperature, fuel composition and so forth. If fuel supply conditions deviate excessively from the designed fuel specification, performance will degrade, e.g., dynamic pressure instabilities and high emissions will occur. Ultimately, conditions may degrade sufficiently to cause the system to trip.

Fuel gas saturation has been employed in a number of integrated gasification combined cycle (IGCC) installations over the last two decades. IGCCs are typically designed with a backup fuel, e.g., distillate, to increase plant availability. Since distillate is high in hydrogen content, the distillate combustion system is designed for diffusion operation, which has much higher tolerance to fuel supply Wobbe number variation than the DLN combustion system employed on most modern natural gas fired turbines. The Wobbe number is important for fuel combustion stability and is calculated according to EQUATION 1:

$$\text{Wobbe Number} = \frac{\text{Fuel Lower Heating Value (Btu}/scf)}{\sqrt{(\text{Fuel Temperature (Deg. Rankine})\times\text{Fuel Mol. Wt.}/28.96)}}$$

The Wobbe number of the fuel gas supplied to the gas turbine tends to vary significantly in IGCC plants, because the fuel composition from the gasification system varies with load and feedstock to the gasifier. The heat source for distillate saturation is the distillate cool down system, which operates at essentially fixed pressure (and hence hot water supply temperature) to the fuel gas saturator across the saturator operating range. Accordingly, the water flow supply to the fuel saturator is constant across the load range, and fuel supply Wobbe number control is not an overriding constraint on the gas turbine combustion system operability or design as it is for DLN premixed combustion systems.

BRIEF SUMMARY OF THE INVENTION

The present invention provides a control method for maintaining fuel moisture level within a narrow range in order to satisfy gas turbine combustion system requirements. Generally, this is achieved by maintaining substantially constant the water-to-dry fuel ratio in the fuel gas saturation column based on measured dry fuel flow and water supply to the saturation column, i.e., recycle water and make-up water, across the fuel gas moisturization system operating range. Also, additional information may be used to adjust the water supply to the saturator column, such as one of the following: gas turbine fuel supply temperature, gas turbine fuel supply moisture content, gas turbine supply fuel composition, and gas turbine fuel supply heating value, to maintain substantially constant the fuel Wobbe number to the gas turbine.

In a preferred embodiment of the invention, dry fuel gas flow to the saturator column is measured and the saturator recycle water flow is summed with the saturator makeup water flow. The recycle water flow is then modulated to hold the water-to-dry fuel ratio substantially constant in the saturator. The substantially fixed ratio thus reduces the variation in Wobbe number, and controls the properties of the fuel entering the gas turbine system. In this preferred embodiment of the invention, the control system may be used in a multi-pressure steam bottoming cycle in which the heat source for fuel moisturization is the gas turbine exhaust gas downstream of the LP (low pressure) evaporator, which for the purposes of fuel moisture and Wobbe number stabilization is operated with a fixed steam pressure.

In another preferred embodiment of the invention, an additional measured or calculated value generating a signal may be used to achieve the desired substantially water-to-dry fuel ratio by providing closed loop feedback to achieve the targeted Wobbe number. The following is a non-exhaustive list of additional measured or calculated signals that may be employed in this manner: gas turbine fuel supply temperature, gas turbine fuel supply moisture content, gas turbine fuel supply composition, and gas turbine fuel supply heating value. Closed loop feedback or open loop water-to-fuel ratio bias based on downstream fuel measurements minimizes gas turbine fuel supply Wobbe number variation during operation of the fuel moisturization system. This embodiment of the invention is preferably for use in applications with a less stable heat source, such as a single pressure steam bottoming cycle operated in sliding pressure mode, a multi-pressure steam bottoming cycle with the LP steam pressure operated in a variable pressure mode, or any other cycle where the saturation water heat source has significant temperature variation.

In a preferred embodiment according to the present invention, there is provided a control system for a gas turbine having a saturator, a dry fuel gas input to the saturator, a water input to the saturator for moisturizing the dry fuel gas in the saturator, and an outlet for providing moisturized fuel gas to the gas turbine, a method for controlling fuel gas saturation comprising the step of maintaining a substantially constant ratio of water input to the saturator to dry fuel gas input to the saturator during premix combustion mode operation of the gas turbine.

In a further preferred embodiment according to the present invention, there is provided an apparatus for supplying moisturized fuel gas to a gas turbine comprising a saturator, a first conduit for supplying dry fuel gas to the saturator, a second conduit for supplying moisturized fuel gas from the saturator to the gas turbine, a third conduit for supplying water to the saturator, and a water flow controller for controlling the flow of water received by the saturator through the third conduit to maintain a substantially constant ratio of water input to dry fuel gas input to the saturator.

DETAILED DESCRIPTION OF THE INVENTION

Figure 1:
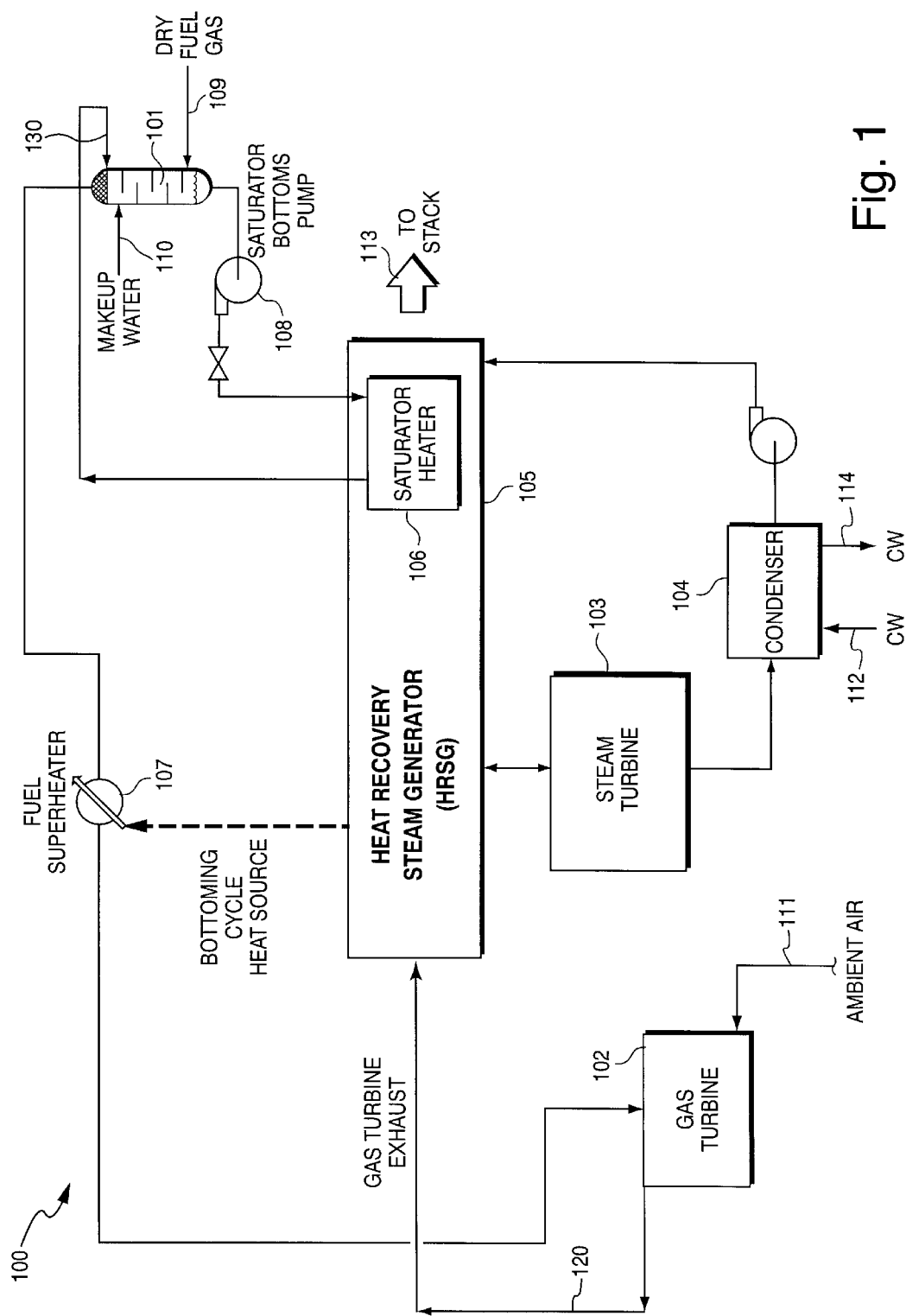
FIG. 1 is a schematic representation of a simplified natural gas fired combined cycle power plant including a fuel gas saturator.

A schematic of a natural gas fired combined cycle power plant containing a modified bottoming cycle for fuel gas moisturization is illustrated in FIG. 1. This schematic is used as an example, and the present invention is not intended to be limited solely to usage in this type of power plant. Also, the type of power plant depicted in FIG. 1 is more fully described in U.S. application Ser. No. 09/340,510, filed Jul. 1, 1999, of common assignee herewith.

A natural gas power plant, generally designated 100, includes a fuel gas saturator 101, a gas turbine 102, a steam turbine 103, a condenser 104, a heat recovery steam generator (HRSG) 105, a saturator heater 106, a fuel superheater 107, and a saturator bottoms pump 108. The chemical process inputs include a dry fuel gas stream 109, a makeup water stream 110, an ambient air stream 111, and a cooling water stream 112. The chemical process outputs are a stack gas stream indicated by the arrow 113 and a cooling water stream 114. Electric energy from a generator (not shown) coupled to the gas and steam turbines is, of course, the principal energy output.

Dry fuel gas provided via stream 109 is bubbled through fuel gas saturator 101, which is a packed or trayed column, moisturizing the fuel gas with water. The saturated fuel gas exits the top of column 101 and is superheated using a bottoming cycle heat source in a fuel superheater 107. From the fuel superheater 107, the superheated fuel enters the gas turbine 102 for combustion. The hot gases comprising the gas turbine exhaust flow to HRSG 105. HRSG 105 comprises a centralized heat exchanger having multiple units for recovering heat from the exhaust gases of the gas turbine 102. The exhaust gases exit the HRSG 105 to the stack 113. Heat recovered from the exhaust of the gas turbine 102 is used to generate steam, which is used by the steam turbine 103. The gas turbine 102 and the steam turbine 103 drive a generator, not shown, for generating electricity. The effluents from the steam turbine system are condensed in condenser 104 using cooling water 112 and returned to the HRSG 105.

Water leaving the bottom of the fuel gas saturator 101 through saturator bottoms pump 108 enters the HRSG 105 and recovers heat from the gas turbine exhaust in saturator heater 106. The heated water is returned to the fuel gas saturator 101 for moisturizing the dry fuel gas. Makeup water 110 is also added to the fuel gas saturator water to replace the water component of the moisturized fuel gas exiting with the moisturized fuel gas, and any blowdown from the saturator vessel, not shown.

Figure 2:
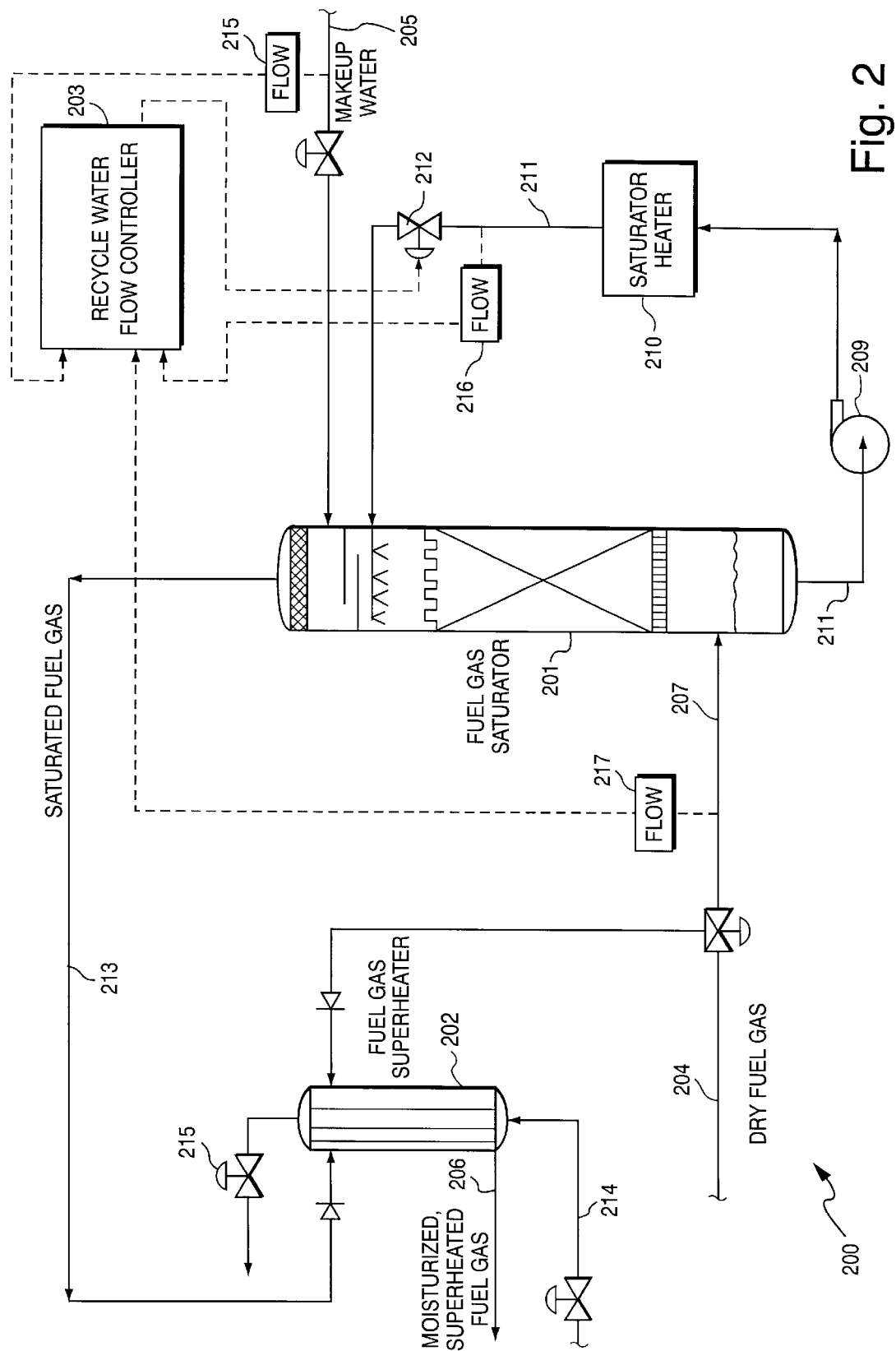
FIG. 2 is a schematic representation of a control system for maintaining the water-to-dry fuel gas ratio substantially constant in accordance with a preferred embodiment of the present invention.

A preferred embodiment of a control system, generally designated 200, for the fuel moisturization system of the present invention is illustrated in FIG. 2. Generally, the fuel gas saturator 201 moisturizes the dry fuel gas input to the saturator 201 via conduit 204, and fuel gas superheater 202 superheats the moisturized fuel gas before entering the gas turbine system, not shown. Recycle water flow controller 203 controls the flow rate of the heated saturated water in conduit 211 to the fuel gas saturator 201. The primary process inputs to saturator 201 are dry fuel gas via conduit 204, make-up water via conduit 205, and heated saturation water via conduit 211. The primary process output is moisturized, superheated fuel gas supplied to the gas turbine via conduit 206.

The dry fuel gas enters the bottom of the fuel gas saturator 201 via conduit 207. In the fuel gas saturator 201, the dry fuel gas contacts water input to the saturator from conduits 211 and 205. Excess water not vaporized exits the bottom of fuel gas saturator 201 via conduit 211. The excess water is pumped by pump 209 through saturator heater 210 and flow control valve 212. As in FIG. 1, saturator heater 210 is heated by the gas turbine exhaust gases in the HRSG. The recycle water in conduit 211 and the makeup water in conduit 205 are delivered to the top of the fuel saturator column 201. The saturated fuel gas exits the fuel gas saturator in conduit 213, is superheated by superheater 202, and exits superheater 202 via conduit 206 en route to the gas turbine. Hot water in conduit 214 enters the superheater 202 in heat exchange relation with the moisturized fuel gas.

Recycle water flow controller 203 minimizes the variation in the fuel properties of the gas that is supplied to the gas turbine by controlling the flow of water in recycle conduit 211 such that a substantially constant ratio of flow of water to saturator 201 (via conduits 211 and 205) to flow of dry fuel gas in conduit 207 is maintained. Flow sensor 215 measures the flow rate of water in make-up conduit 205. Flow rate sensor 216 measures the flow rate of heated saturation water in conduit 211. The flow rate of makeup water in conduit 205 is added to the flow rate of recycle water in conduit 211 to determine the flow rate of water to the saturator 201. Flow rate sensor 217 measures the flow rate of dry fuel gas supplied to fuel gas saturator 201 via conduit 207. Signals from sensors 215, 216, and 217 are sent to the recycle water flow controller 203 for processing and controlling the flow of recycle water in conduit 211 by controlling valve 212.

Figure 3:
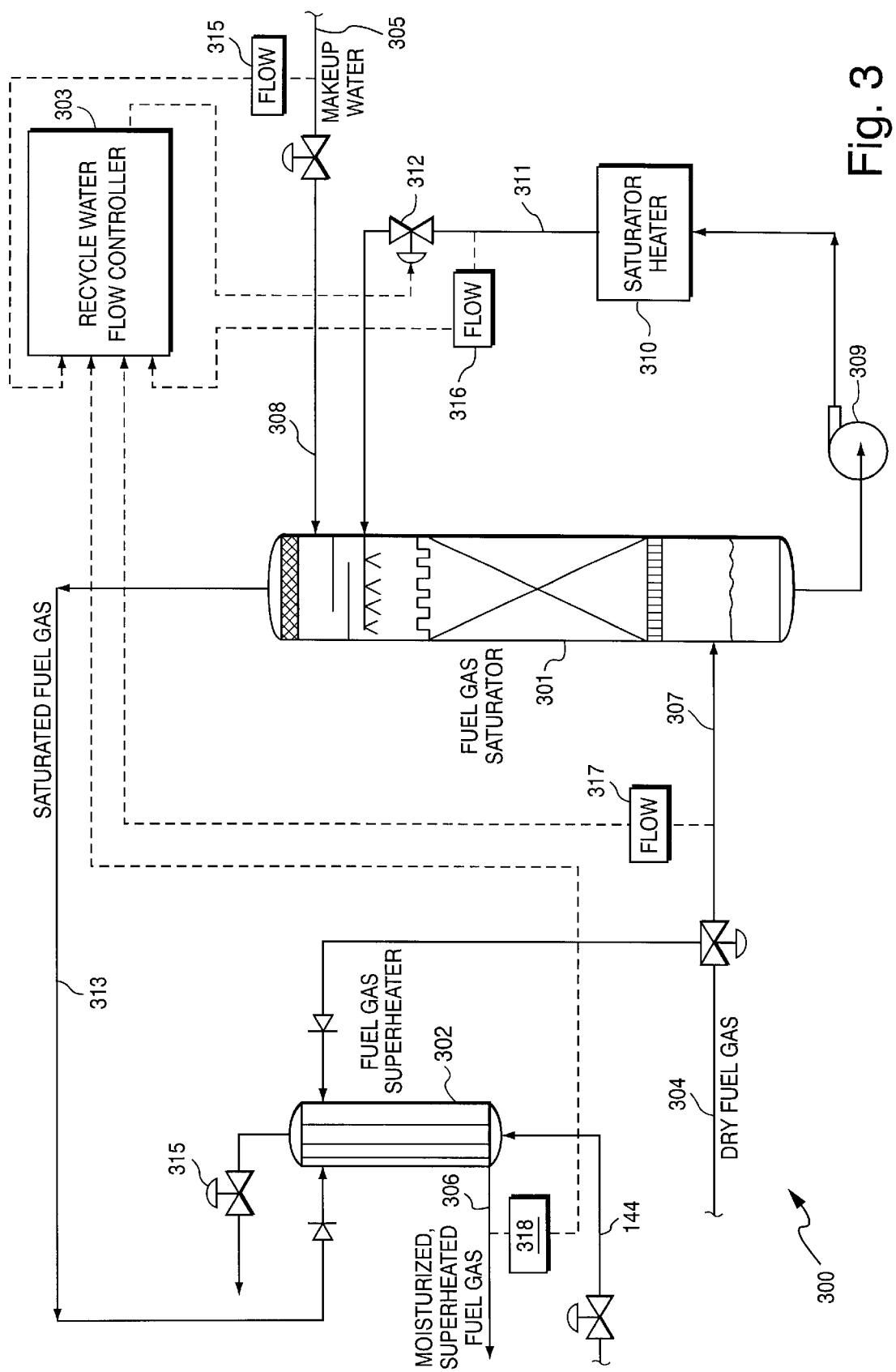
FIG. 3 is a schematic representation similar to FIG. 2 illustrating a control system hereof in accordance with another preferred embodiment of the invention.

In another preferred embodiment of the present invention illustrated in FIG. 3, and generally designated 300, like references are applied to like parts as in FIG. 2, advanced by 100. In this embodiment, sensor 318 is added to the control system. Sensor 318 measures a property of moisturized, superheated fuel gas in conduit 306. For example, sensor 318 may measure one or more of the following properties of the fuel gas in conduit 306: fuel gas temperature, fuel gas moisture content, fuel gas composition, and fuel gas heating value. Recycle water flow controller 303 processes the additional signal from sensor 318 in conjunction with the flow signals generated by flow sensors 315, 316 and 317 and adjusts the flow rate of heater water in conduit 311 by controlling valve 312. Similar to the preferred embodiment of FIG. 2, the control system of FIG. 3 minimizes variation in the fuel gas properties in conduit 306, especially those properties represented by the Wobbe number, by biasing the ratio of the sum of the saturation water flow of conduit 311 and the saturator make-up flow in conduit 305 to dry fuel ratio based on the feedback from sensor 318.

Figure 4:
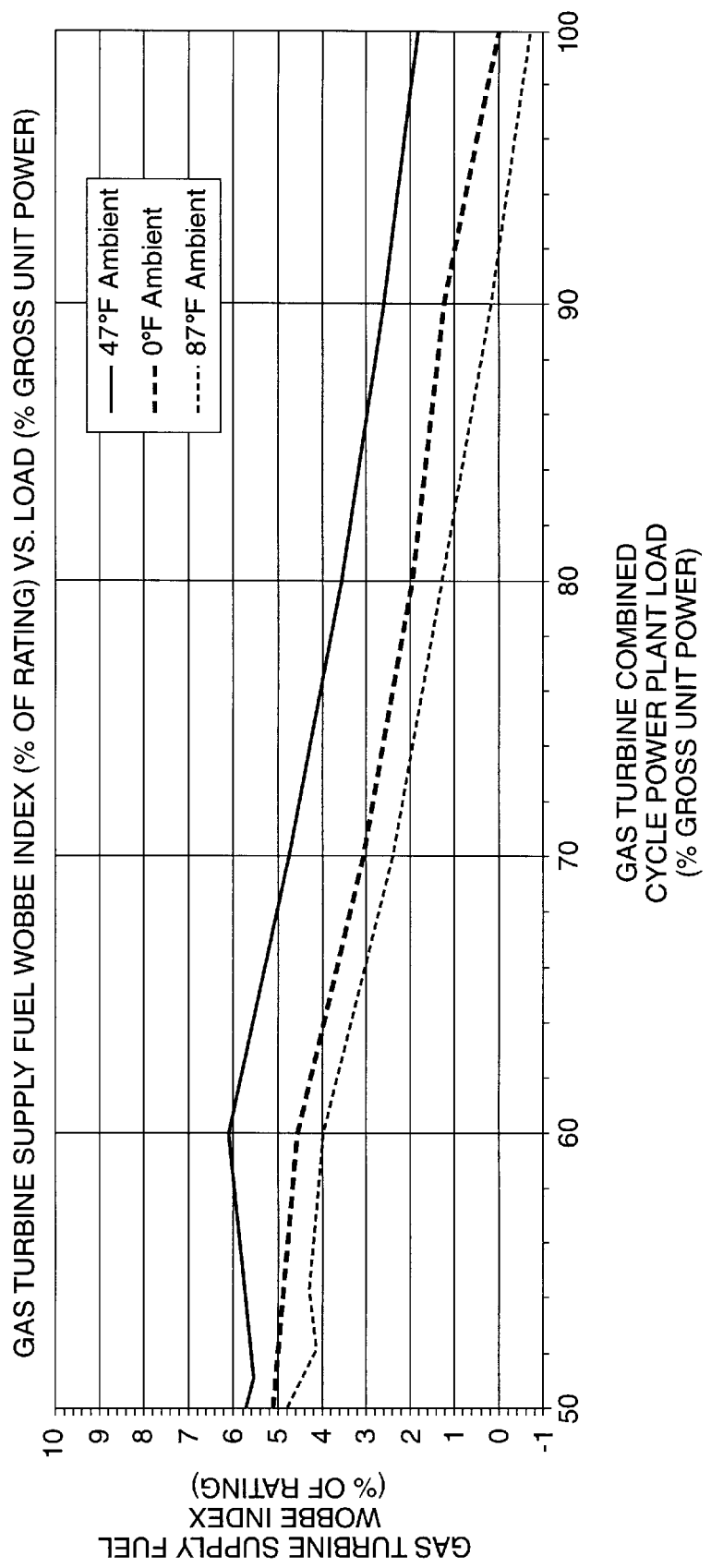
FIG. 4 is a graph illustrating the relationship between the Wobbe Index and a gas turbine combined cycle power plant load using a prior art system.

FIG. 4 is a graph illustrating the variation in fuel Wobbe number in a prior art process of constant water flow rate to the saturator column. Three trials were performed at various ambient temperatures of zero, forty-seven, and eighty-seven degrees Fahrenheit. The Wobbe number of the gas turbine fuel supply was recorded for loads between fifty and one hundred percent of the maximum power. The ordinate shows the Wobbe number expressed as a percentage of rating. As is appreciated by inspection of the graph, the Wobbe number has a maximum percentage rating of six percent and a minimum percentage rating of negative one percent. Thus, over this anticipated operating range, fuel supply varies widely.

Figure 5:
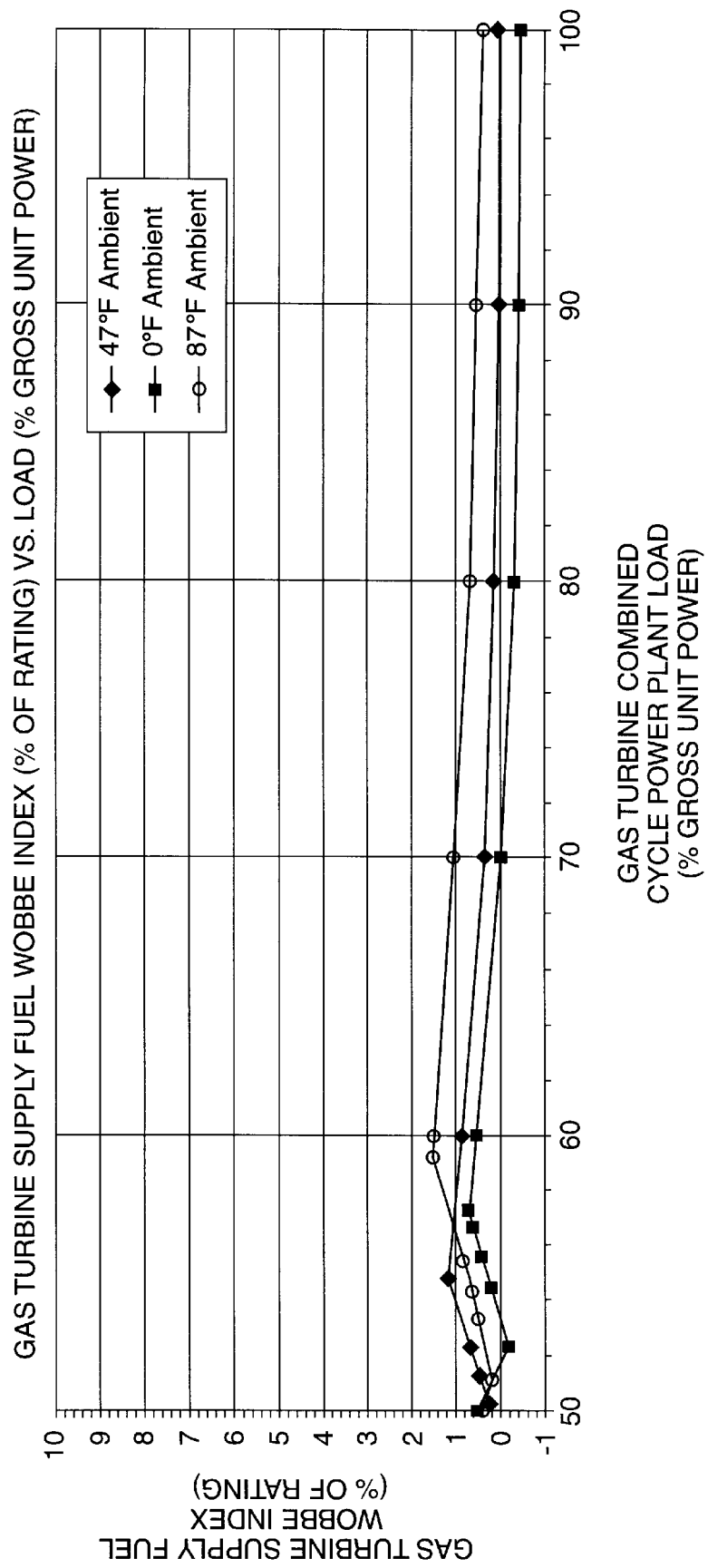
FIG. 5 is a graph illustrating the relationship between Wobbe Index and gas turbine combined cycle power plant load using a preferred embodiment of the invention.

A graph of the variation in fuel Wobbe number using a preferred embodiment of the present invention is shown in FIG. 5. Three trials were performed at various operating conditions. Experiments were run at ambient temperatures of 0° F., 47° F. and 87° F. Similar to the prior art process graph shown in FIG. 3, the Wobbe number of the gas turbine supply fuel was recorded for loads between fifty and one-hundred percent of the maximum power, which is shown by the abscissa. The vertical axis shows the Wobbe number expressed as a percentage of rating. The range of percentage rating spans approximately one and one-half percent to minus one percent. Accordingly, the total variation is approximately two percent. A comparison of FIG. 4 and FIG. 5 demonstrates the utility of the invention in maintaining a relatively constant Wobbe number, and therefore the fuel properties of moisturized, superheated fuel entering the gas turbine system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a control system for a gas turbine having a saturator, a dry fuel gas input to the saturator, a water input to the saturator for moisturizing the dry fuel gas in the saturator, and an outlet for providing moisturized fuel gas to the gas turbine, a method for controlling fuel gas saturation comprising the step of maintaining a substantially constant ratio of water input to the saturator to dry fuel gas input to the saturator during premix combustion mode operation of the gas turbine, including maintaining a substantially constant Wobbe number for the moisturized fuel gas supplied to the gas turbine.

2. A method according to claim 1 wherein the step of maintaining the substantially constant moisturized fuel gas Wobbe number includes measuring a gas turbine moisturized fuel gas supply property.

3. A method according to claim 1 wherein the step of maintaining the substantially constant moisturized fuel gas Wobbe number includes measuring a gas turbine moisturized fuel gas supply temperature.

4. A method according to claim 1 wherein the step of maintaining the substantially constant moisturized fuel gas Wobbe number includes measuring a gas turbine moisturized fuel supply moisture content.

5. A method according to claim 1 wherein the step of maintaining the substantially constant moisturized fuel gas Wobbe number includes measuring a gas turbine moisturized fuel gas supply composition.

6. A method according to claim 1 wherein the step of maintaining the substantially constant moisturized fuel gas Wobbe number includes measuring a gas turbine moisturized fuel gas supply heating value.

7. A method according to claim 1 wherein the step of maintaining the substantially constant moisturized fuel gas Wobbe number includes measuring at least two of the temperature, moisture content, a composition, and heating value of the moisturized fuel gas supply.

8. A method according to claim 7 including controlling the ratio of water input to dry fuel gas input to said substantially constant ratio in response to said at least two measurements.

9. A method according to claim 1 wherein the step of maintaining the substantially constant moisturized fuel gas Wobbe number includes measuring a flow rate of the water input to the saturator.

10. A method according to claim 1 wherein the step of maintaining the substantially constant moisturized fuel gas Wobbe number includes measuring a flow rate of the dry fuel gas input to the saturator.

11. A method according to claim 10 including controlling the ratio of water input to dry fuel gas input to said substantially constant ratio in response to the measured flow rate of the dry fuel gas input to the saturator.

12. A method according to claim 1 wherein the Wobbe number is maintained within a variation of about two percent for loads between 50–100% of maximum gas turbine power.

13. A method according to claim 1 including measuring at least one of a gas turbine moisturized fuel gas supply temperature, a gas turbine moisturized fuel supply moisture content, a gas turbine moisturized fuel gas supply composition and a gas turbine moisturized fuel gas supply heating value, and controlling the ratio of water input to dry fuel gas input to said substantially constant ratio in response to said at least one measurement.

14. An apparatus for supplying moisturized fuel gas to a gas turbine comprising a saturator, a first conduit for supplying dry fuel gas to said saturator, a second conduit for supplying moisturized fuel gas from said saturator to the gas turbine, a third conduit for supplying water to said saturator, and a water flow controller for controlling the flow of water received by the saturator through said third conduit to maintain a substantially constant ratio of water input to dry fuel gas input to the saturator, and to maintain a substantially constant Wobbe number for the moisturized fuel gas supplied to a low $NO_x$ gas turbine combustion system.

15. Apparatus according to claim 14 wherein the flow controller maintains the Wobbe number substantially constant within a variation of about two percent for loads between 50–100% of maximum gas turbine power.

* * * * *

UNITED STATES PATENT AND TRADEMARK OFFICE
CERTIFICATE OF CORRECTION

PATENT NO.       : 6,502,402 B1
APPLICATION NO.  : 09/711157
DATED            : January 7, 2003
INVENTOR(S)      : Smith et al.

It is certified that error appears in the above-identified patent and that said Letters Patent is hereby corrected as shown below:

Column 1, line 2, below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*